US009778706B2

(12) United States Patent
McKenzie

(10) Patent No.: US 9,778,706 B2
(45) Date of Patent: Oct. 3, 2017

(54) PEEKABLE USER INTERFACE ON A PORTABLE ELECTRONIC DEVICE

(75) Inventor: Donald Somerset McKenzie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 82 days.

(21) Appl. No.: 13/404,308

(22) Filed: Feb. 24, 2012

(65) Prior Publication Data
US 2013/0222323 A1    Aug. 29, 2013

(51) Int. Cl.
*G06F 3/041*  (2006.01)
*G06F 3/044*  (2006.01)
*G06F 1/16*  (2006.01)
*G06F 1/32*  (2006.01)
*H04M 1/04*  (2006.01)
*G06F 3/0488*  (2013.01)

(52) U.S. Cl.
CPC ............ *G06F 1/169* (2013.01); *G06F 1/3215* (2013.01); *G06F 1/3265* (2013.01); *G06F 3/04883* (2013.01); *H04M 1/04* (2013.01); *G06F 1/1626* (2013.01); *G06F 2200/1633* (2013.01); *G06F 2203/04803* (2013.01); *G06F 2203/04808* (2013.01); *H04M 2250/22* (2013.01); *Y02B 60/1242* (2013.01); *Y02B 60/32* (2013.01)

(58) Field of Classification Search
CPC ..... Y02B 60/32; Y02B 60/1242; H04M 1/04; H04M 2250/22
See application file for complete search history.

(56) References Cited

U.S. PATENT DOCUMENTS

| 5,712,995 A | 1/1998 | Cohn |
| 8,046,721 B2 | 10/2011 | Chaudhri et al. |
| 2007/0252821 A1* | 11/2007 | Hollemans et al. .......... 345/173 |
| 2008/0261664 A1* | 10/2008 | Parry ..................... A45C 11/00 455/575.3 |
| 2009/0058429 A1 | 3/2009 | Harris et al. |
| 2009/0058822 A1* | 3/2009 | Chaudhri ............ G06F 3/04883 345/173 |
| 2009/0228790 A1 | 9/2009 | Chiu |

(Continued)

FOREIGN PATENT DOCUMENTS

| CA | 2733214 A1 | 10/2011 |
| GB | 2 482 931 A | 2/2012 |

OTHER PUBLICATIONS

European Search Report from corresponding EP application 12156967.7 dated Jul. 12, 2012.

(Continued)

*Primary Examiner* — Bryan Earles
(74) *Attorney, Agent, or Firm* — Moffat & Co.

(57) ABSTRACT

A method and portable electronic device are provided that presents a user interface based upon detected input, such as a touch contact with a touch-sensitive display of the portable electronic device, from displacement of a covering apparatus to uncover a portion of the display while the display is in a low power condition such as a sleep state. The information in the user interface that is displayed is determined at least in part by the extent of the displacement of the covering apparatus. The user of the device can peek at the user interface of the device and not have to completely uncover or remove the device from the covering apparatus to view particular types of information.

18 Claims, 11 Drawing Sheets

(56) References Cited

U.S. PATENT DOCUMENTS

| | | | |
|---|---|---|---|
| 2010/0105443 A1 | 4/2010 | Vaisanen | |
| 2010/0171753 A1 | 7/2010 | Kwon | |
| 2010/0182248 A1 | 7/2010 | Chun | |
| 2010/0185989 A1* | 7/2010 | Shiplacoff | G06F 3/0416 715/856 |
| 2010/0285881 A1* | 11/2010 | Bilow | 463/37 |
| 2011/0175839 A1 | 7/2011 | Prabhu | |
| 2011/0205163 A1* | 8/2011 | Hinckley | G06F 3/0483 345/173 |
| 2011/0273479 A1 | 11/2011 | Ingrassia, Jr. et al. | |
| 2012/0068798 A1* | 3/2012 | Lauder et al. | 335/306 |
| 2012/0072167 A1* | 3/2012 | Cretella et al. | 702/150 |
| 2012/0113572 A1* | 5/2012 | Gaddis, II | G06F 1/1628 361/679.01 |
| 2012/0304114 A1* | 11/2012 | Wong et al. | 715/800 |
| 2013/0061170 A1* | 3/2013 | Friedlander | G06F 3/048 715/800 |
| 2013/0076614 A1* | 3/2013 | Ive et al. | 345/156 |
| 2013/0106710 A1* | 5/2013 | Ashbrook | G06F 3/0488 345/173 |

OTHER PUBLICATIONS www.evernote.com/peek—Feb. 24, 2012.
Office Action dated May 28, 2014 that issued with respect to corresponding Canadian Patent Application No. 2,806,801.
Canadian Intellectual Property Office, Office Action on Application No. 2,806,801 , Issued on Oct. 5, 2015.
European Patent Office, Office Action on Application No. 12156967.7 , Issued on Jan. 20, 2016.
Canadian Intellectual Property Office, Office Action for Application No. 2806801, dated Oct. 20, 2016.

* cited by examiner

PEEKABLE USER INTERFACE ON A PORTABLE ELECTRONIC DEVICE

TECHNICAL FIELD

The present disclosure relates generally to displaying user interface information on a portable electronic device.

BACKGROUND

Touch-sensitive displays, or touch screens, have become more prevalent in portable electronic devices and providing an information display and interaction interface. Touch-sensitive displays enable users to interact with the device using numerous interaction points rather than a fixed binary button configuration. However, the portable electronic device can be deactivated in a sleep mode or locked by the user, when placed in a protective case, or when the display is covered requiring the user to remove or uncover the display and perform an unlock or wake gesture in order to access content.

Accordingly, there is a need for effectively viewing information on a portable electronic device.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
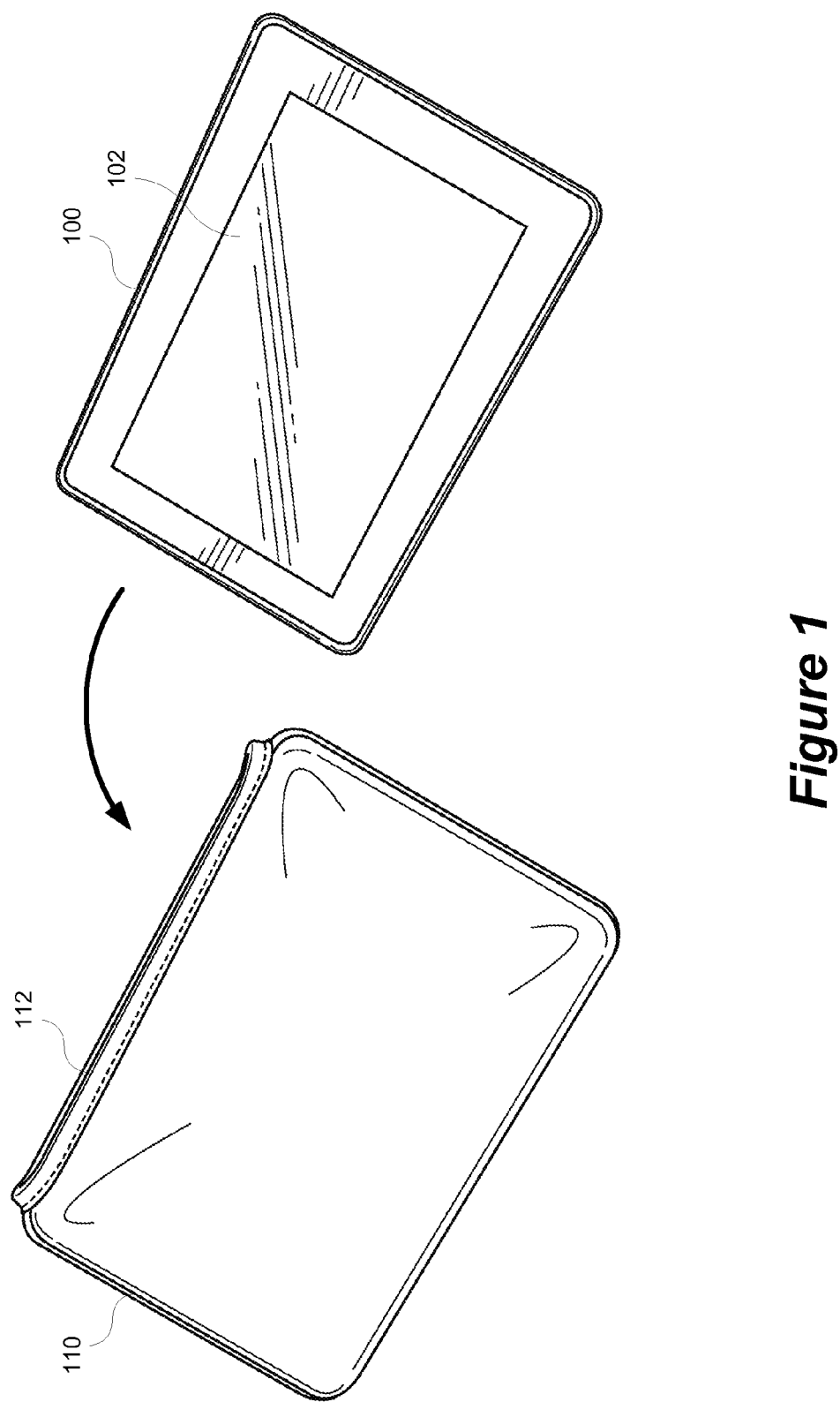
FIG. 1 shows a representation of portable electronic device and a sleeve type covering apparatus.

In accordance with an aspect of the present disclosure there is provided a method of displaying a user interface on a portable electronic device, the method comprising: detecting an input corresponding to displacement of a covering apparatus, the displacement uncovering a portion of a display of the portable electronic device, the display being in a low power condition; and illuminating at least the uncovered portion of the display and displaying the user interface, the user interface presenting information that is determined at least in part by the extent of the displacement.

In accordance with another aspect of the present disclosure there is provided a portable electronic device comprising a touch-sensitive display; a processor coupled to the touch-sensitive display; a memory coupled to the processor containing instructions which when executed by the processor perform: detecting an input corresponding to displacement of a covering apparatus, the displacement uncovering a portion of the touch-sensitive display of the portable electronic device, the touch-sensitive display being in a low power condition; and illuminating at least the uncovered portion of the touch-sensitive display and displaying the user interface, the user interface presenting information that is determined at least in part by the extent of the displacement.

In accordance with yet another aspect of the present disclosure there is provided a computer readable memory containing instructions for presenting a user interface on a portable electronic device, the instructions which when executed by a processor performing the method comprising: detecting an input corresponding to displacement of a covering apparatus, the displacement uncovering a portion of a display of the portable electronic device, the display being in a low power condition; and illuminating at least the uncovered portion of the display and displaying the user interface, the user interface presenting information that is determined at least in part by the extent of the displacement.

Although the following description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. Embodiments are described below, by way of example only, with reference to FIGS. 1-15.

When a user inserts a portable electronic device in a covering apparatus such as a sleeve or a pouch, or covers the display of the device with a cover, the device is typically placed into a low power condition and locked for security or to not allow inadvertent interaction with the device. However there are tasks such as checking the time, check if new e-mail has arrive, social network status changes or media playback status where the users only needs to momentarily access information on the device and performing an unlock and then navigating to a particular application to retrieve information can be cumbersome and inconvenient. The present disclosure provides a user interface (UI) to present information commonly accessed by the user for brief segments that is contextual to the display of the device being partially uncovered and is activated an input from the covering apparatus or a touch contact, interface gestures or meta-navigation gestures. The portable electronic device detects that it is in a covering apparatus, for example using the magnetic case hall effect sensor that activates holster events, when in the covering apparatus, the device detects input to activate a special UI when in "case mode" and illuminate the display. The UI displays a simplified view of the type of information a user would want to access quickly without having to remove it from the case (time, last message received etc). When the top of the case is stretched down (performing a gesture) to "peek" at the display, or when the device is pulled out of a case, or a cover lifted, a special UI is shown giving a limited and more targeted display of information based upon a touch contact, interface gesture, meta-navigation gesture or movement of the device or cover to display a portion of the display. Different information may be presented depending on an application being executed on the device such as a media player. In addition different types of display contact would display different types of information depending on the amount of display area that is visible from the case. For example, "peeking" at the display with one finger could show the time, two fingers could display further information such as a message list or a media play song list if audio is being playback on the device, with the assumption that more display area would be visible. The user of different covering apparatus design such as sleeve cases, pouch cases, removable screen covers, or folio designs could portray the information in a different manner. For example a foldable or articulating case or display cover may display different amount of information based upon the portion of the cover that has been folded back and the orientation of the case portrait vs. landscape would define how and where the display area would be visible to the user when 'peeking' at the display.

FIG. 1 shows a representation of portable electronic device 100 and a covering apparatus 110. In this example the portable electronic device 100 is a tablet type form factor and the covering apparatus is a sleeve type case made of a flexible material in which the portable electronic device 100 is inserted through a lengthwise opening 112. The touch-display 102 of the portable electronic device 100 is covered by the covering apparatus 110 material when placed inside.

Figure 2:
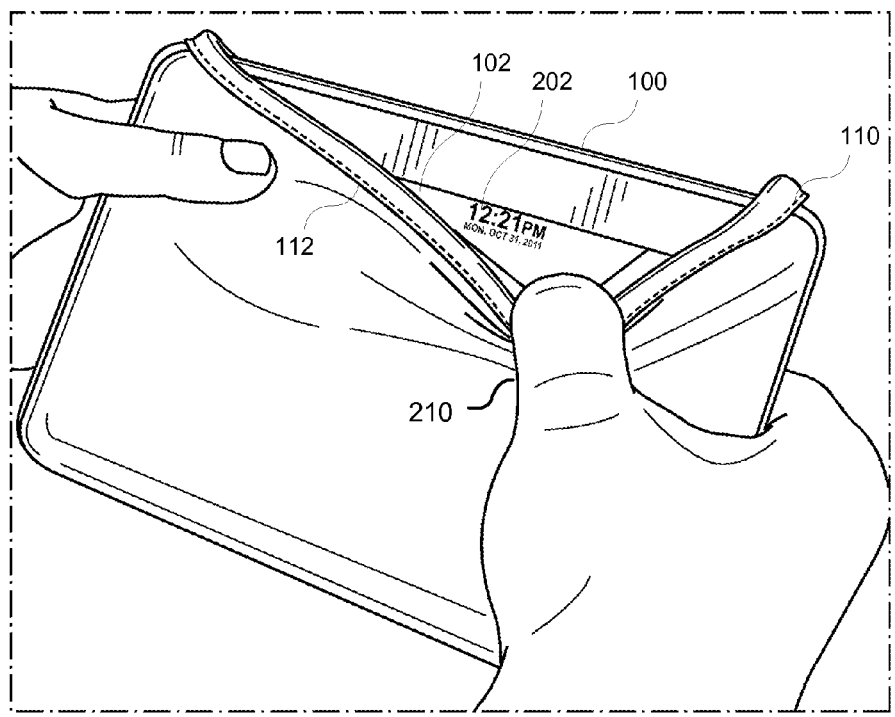
FIG. 2 shows a representation of the peekable user interface when the portable electronic device is in the covering apparatus using a single finger gesture.

FIG. 2 shows a representation of the peekable user interface when the portable electronic device is in the covering apparatus using a single finger gesture. When the portable electronic device 100 is placed in the covering apparatus sleeve case 110, the portable electronic device 100 is in a sleep, low power condition or locked state until some form of user interaction occurs in which a unlock screen would be presented. The state of the portable electronic device 100 may be based upon an action performed by the user prior to placing the portable electronic device 100 in the case such as locking the device or placing the device in a sleep mode, or by the device detecting the insertion into a case 110 by one or more sensors on the portable electronic device 100. Once the portable electronic device 100 is inserted in the case the top portion of the opening of the case 110 on top of the display 102 can be moved by the user finger 210. The portable electronic device 100 senses an input such as a touch contact which may be part of a gesture on the touch-sensitive display 102, while within the case, and illuminates the display to display content or information 202 based upon the input in the uncovered portion of the touch-sensitive display 102. In this example a single finger 210 touch contact would present information of a first information type such the time 202 which would easily fit within the displayable screen area. The portable electronic device 100 can display content based upon the amount of display real estate display that would be visible based upon the type of case 110 and the position of the touch contact or gesture received. When the touch contact is removed the touch-sensitive display 102 returns to the low power condition. The covering apparatus is made of a material with sufficient insulating properties that does not allow user touch contact to be conveyed through the case itself to ensure that false touch contacts are not generated.

Figure 3:
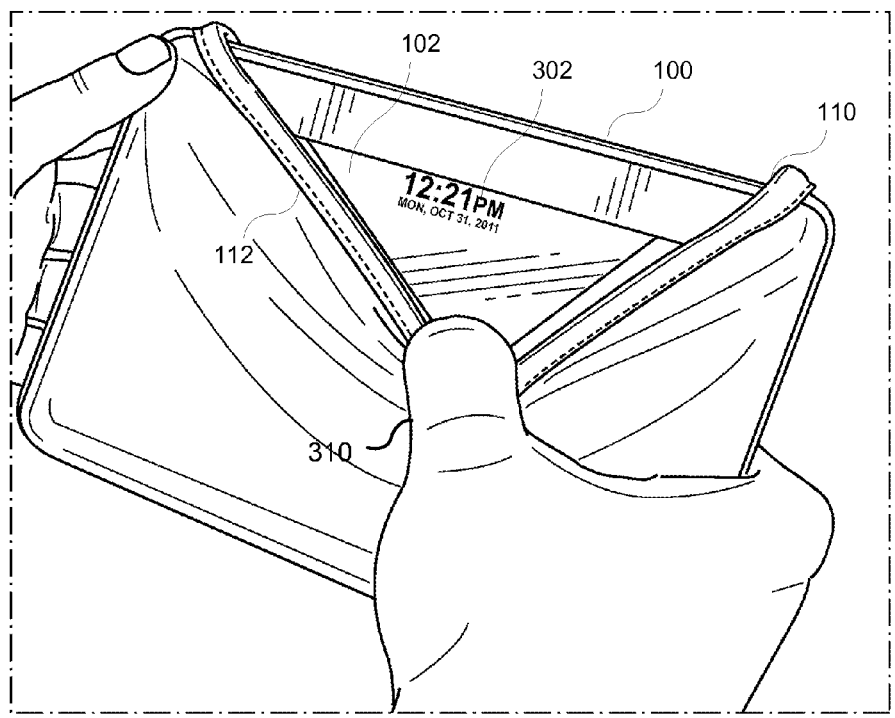
FIG. 3 shows another representation of the peekable user interface when the portable electronic device is in the covering apparatus using a single finger gesture.

FIG. 3 is similar to FIG. 2 as a single finger gesture is performed on the touch-sensitive display 102 of the device; however the display is resized to account for the larger portion of display real-estate 302 that the show but the same information is show. However the information itself may be resized or scaled based upon the determined display room available. The device may only render or activate the display area that would be visible based upon the case type.

Figure 4:
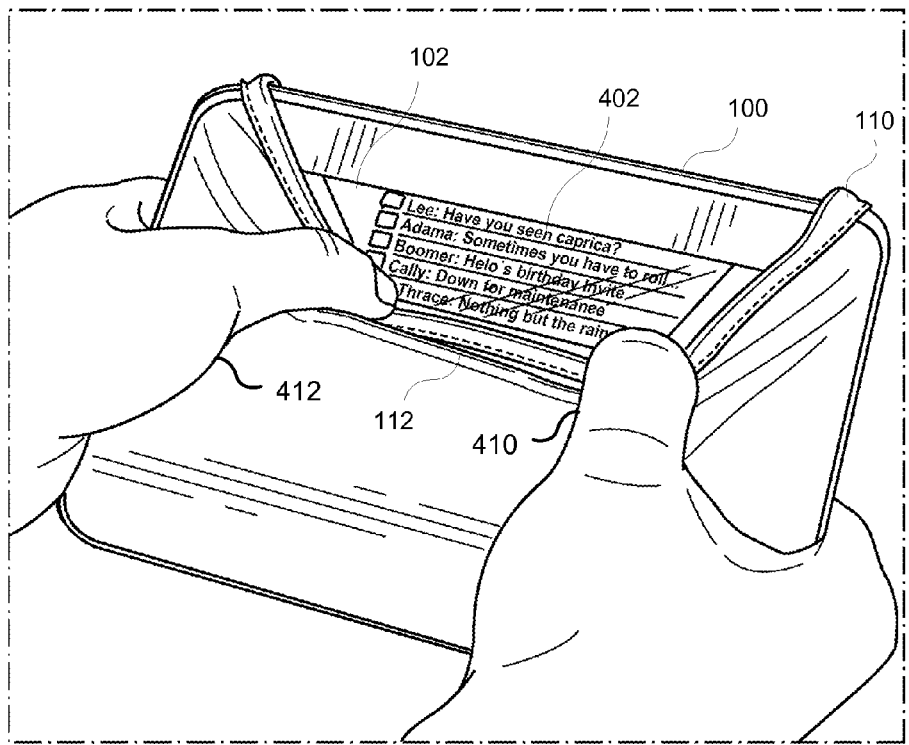
FIG. 4 shows a representation of the peekable user interface when the portable electronic device is in a covering apparatus using a two finger gesture.

FIG. 4 shows a representation of the peekable user interface when the portable electronic device is in a covering apparatus using a two finger touch contact. In this example when a two finger touch contact 410 412 is performed by the user to pull do down the covering apparatus from the display. As the device senses multiple touch contacts and a larger display area is visible, and illuminated, more or different information of a second information type is displayed in the UI 402 such as a list of e-mail message received on the device 100. The user may not be able to interact with the content as the device may be locked and can only show certain content items. Alternatively the content that is displayed based upon the touch contact may be application dependent such as showing media playlist if the device is playing media content. In addition, gestures or meta-navigation gestures associated with the touch contact may be utilized to determine the information in the UI to be show. For example, if the left finger 412 is lower on the display than the right finger 410 the device may show social networking information where as if the fingers 410 412 are approximate at the same level e-mail information may be displayed or if the touch contact is associated with a direction of the swipe on the display, different information may be presented based upon the direction.

Figure 5:
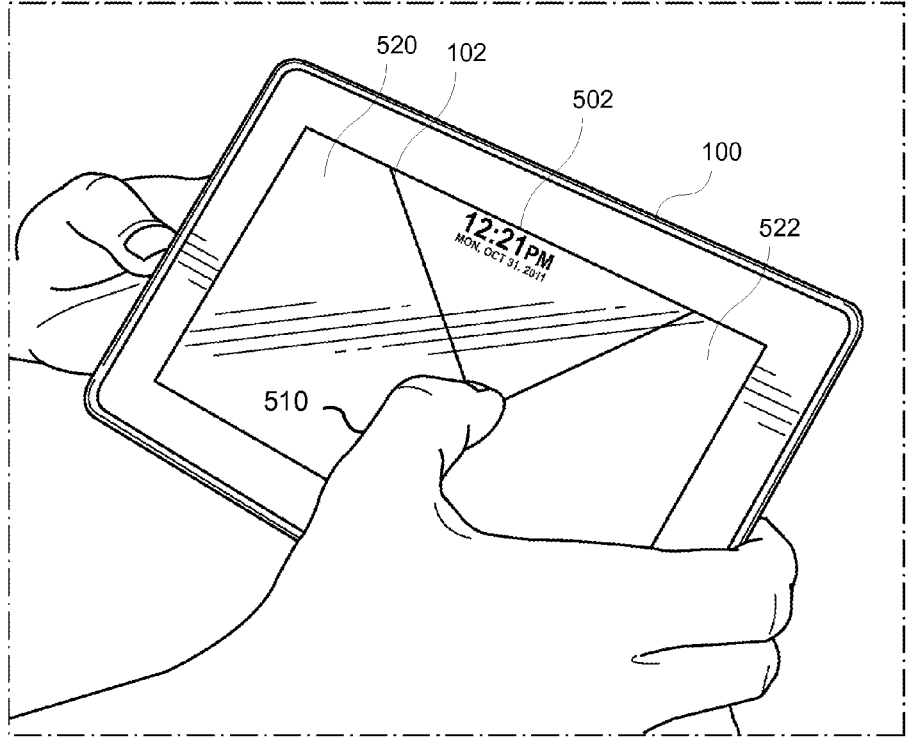
FIG. 5 shows a representation of the peekable user interface when the device is not in the covering apparatus using a single finger gesture.

FIG. 5 shows a representation of the peekable user interface when the device is not in the covering apparatus using a single finger touch contact as an example of the rendering of the display that would occur when within the case. As shown a single finger touch contact point defines a display region based upon the type of case, in this example a sleeve type case. Only a portion of the display 102 is illuminated or activated 502 based upon a single finger 510 touch contact input as would be defined by the movement of the material of the case. Other portions of the display 102 such as on the left 520 and right 522 sides of the active display portion may remain inactive or not display any content to conserve power resources. Similarly a two finger touch contact input may occur, to define a quadrilateral display area based upon the touch contact position relative to an orientation of one of the display edges. The display area may be defined based upon the touch contact position relative to a top edge of the display or based on a gesture input defining the starting positions of the gesture and the end positions of the gesture creating the quadrilateral display area. In the case of a touch-sensitive non-display area, as will be described in regards to FIGS. 14 and 15 and meta-navigation gestures, the contact points on the non-display area would be used to identify the start position, or top, of the quadrilateral display area.

Figures 6, 7:
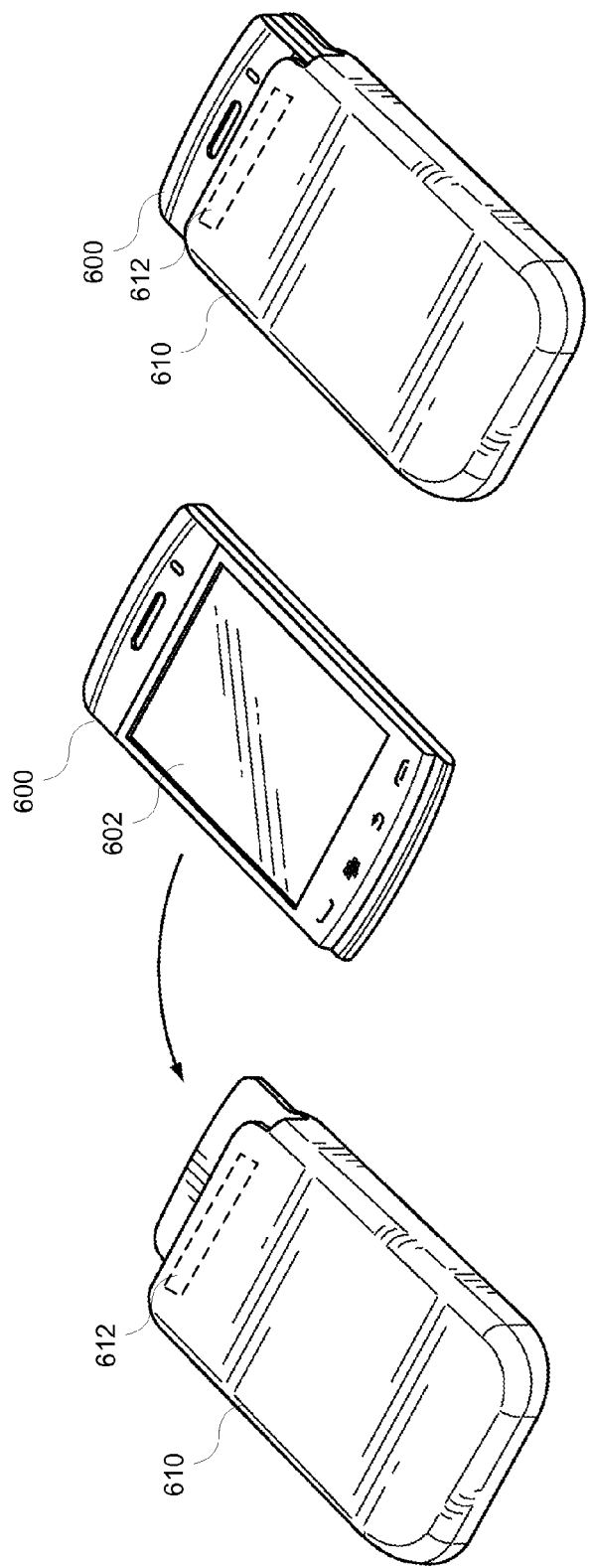
FIG. 6 shows a representation of a portable electronic device and a pocket pouch type covering apparatus.
FIG. 7 shows a representation of the portable electronic device in the pocket pouch covering apparatus.

FIG. 6 shows a representation of a portable electronic device 600 and a pocket pouch type covering apparatus 610. In this example the portable electronic device 600 is of a small form factor such as a smart phone or mobile device having a touch-sensitive display 602. A pocket pouch type case is shown 610 has a capacitive element 612 embedded within the case which will contact the touch-sensitive display 602 of the portable electronic device 600 as shown in FIG. 7 to provide the input to determine the displacement of the display 602. When the portable electronic device 600 is fully inserted in the case 610 the capacitive element may not contact a touch-sensitive portion of the display but be positioned above the display 602 on an inactive portion of the device 600. The pocket pouch type covering apparatus may also be provided with a strap to cover over the top of the device 600.

Figure 9:
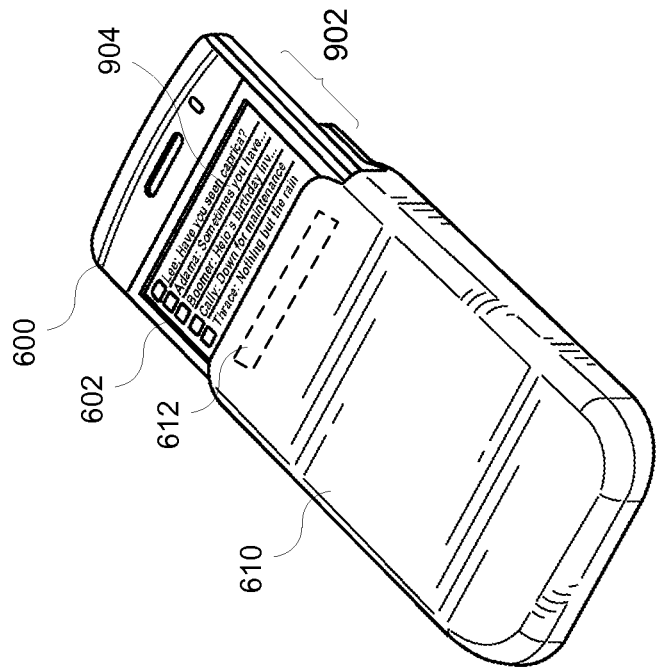
FIG. 9 shows a representation of the portable electronic device in the pocket pouch covering apparatus in a second display position.
Figure 8:
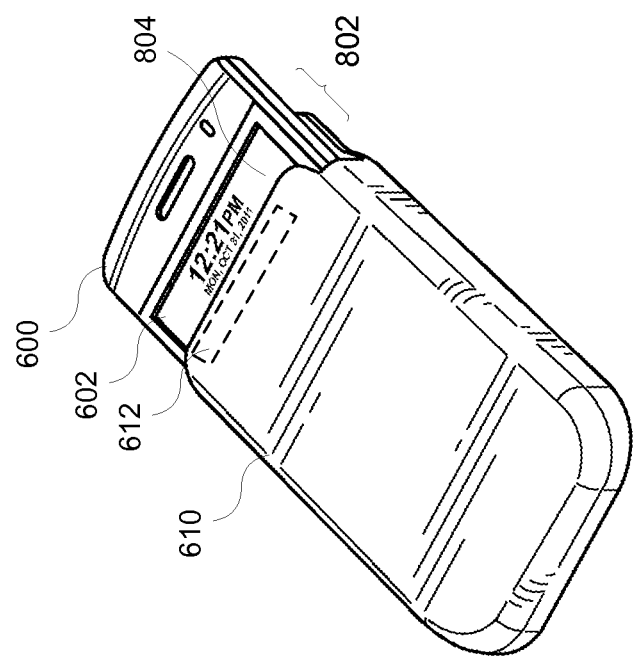
FIG. 8 shows a representation of the portable electronic device in the pocket pouch covering apparatus in a first display position.

FIG. 8 shows a representation of the portable electronic device 600 in the pocket pouch covering apparatus 610 in a first display position 802. In this example the device 600 is displaced partially out the covering apparatus 610. As the device 600 is only partially in the case the touch-sensitive display 602 determines the relative position of the capacitive element 612 along the length to a first position 802 of the touch-sensitive display 602 and the portion of visible display area. Information to be displayed in the user interface is determined and displayed for a first information type such as time information 804 and the display is illuminated with the information. If the capacitive element 612 moves further along the touch-sensitive display 602 surface to a second display position 902, alternate or additional information of a second information type can be displayed 904 such as e-mail items as shown in FIG. 9, or other changeable status information or content such as social network status updates, text message, phone message, weather, media player status, or other updatable content. When more of the display is displaced additional area is illuminated to show the second information type. Although this example is shown using a capacitive element 612 in the covering apparatus 610, a finger touch contact or gesture input may also be utilized to determine the information for display when inserted in the case. The distance of the finger contact input along the length of the display rather than a number of fingers sensed may be used due to the smaller display 602 size. Alternatively, for a portable electronic device that is a slider type device where the keyboard is accessible by sliding the display of the device upwardly, the information displayed may be shown based upon the distance by which the keyboard is exposed and not require an unlock to be performed to view information. For example if the keyboard is partially visible defining the input to define a display area, the time may be shown on the display while it is exposed, and if more of the keyboard is visible other content such as recent e-mails may be shown. The relative position of the display over the keyboard defines the input that may result in different content being displayed on the display of the device until it is in a fully visible position or an unlock is performed.

Figure 10:
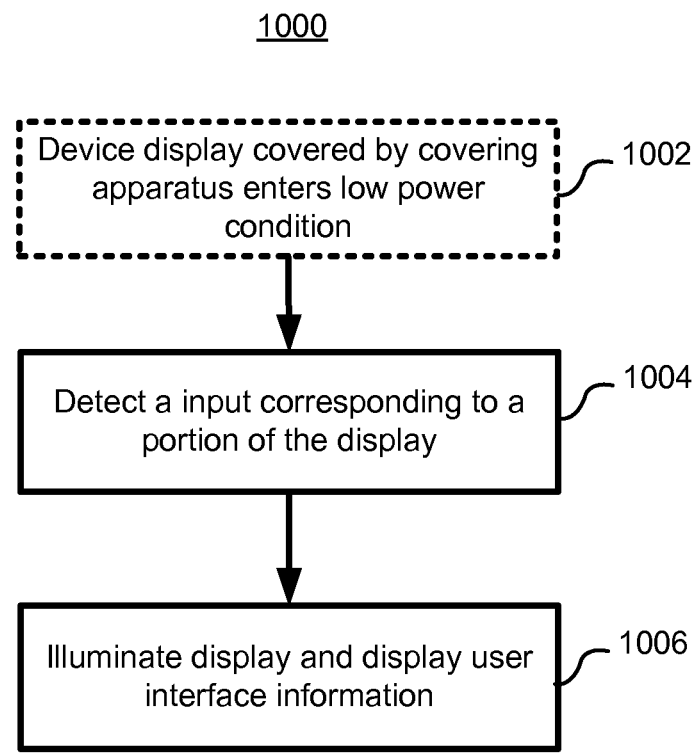
FIG. 10 shows a method of displaying a user interface when inserted in a covering apparatus.

FIG. 10 show a method 1000 of providing a peekable user interface on a portable electronic device. The portable electronic device is inserted in to or covered by the covering apparatus and enters a low power condition (1002). By covering of the display, by a cover or by insertion into a case, the device is placed in a sleep mode by the user or by the portable electronic device detecting the insertion by a sensor, such as a magnetic sensor, or by changes in conditions around the portable electronic device such as light. The device then detects an input by displacement of the covering apparatus. The input may be detected from movement of the covering apparatus or by a touch input or contact on the display or by an input sensor of the portable electronic device, while a portion of the display is visible and a remaining portion is covered by the covering apparatus (1004). To enable contact with the display, the device or the case must be moved to uncover a portion of the display to be visible and enable contact with the display. For example in a covering apparatus such as a sleeve case, a portion of the case may be slid downward by the user, while in a pouch type case the device may be pulled upward to display a portion of the display, and a foldable segmented cover may be partially folded away from the display. The visible or displaced portion of the display is then illuminated, exiting a low power condition, and the user interface is then displayed on the touch-sensitive display while detecting the input, the user interface information is determined based on a position of the input on the display (1006) enabling the user to readily access peekable information without unlocking or complete uncovering or removing of the device from the covering apparatus. If the input is removed by re-covering with the protective apparatus it will re-enter a low power condition. In a foldable or articulating cover type covering apparatus multiple capacitive elements may be embedded in the cover where the device detects the number of touch contacts, for example two out of three cover segments are covering the display and therefore only a third portion of the display is visible.

Figure 11:
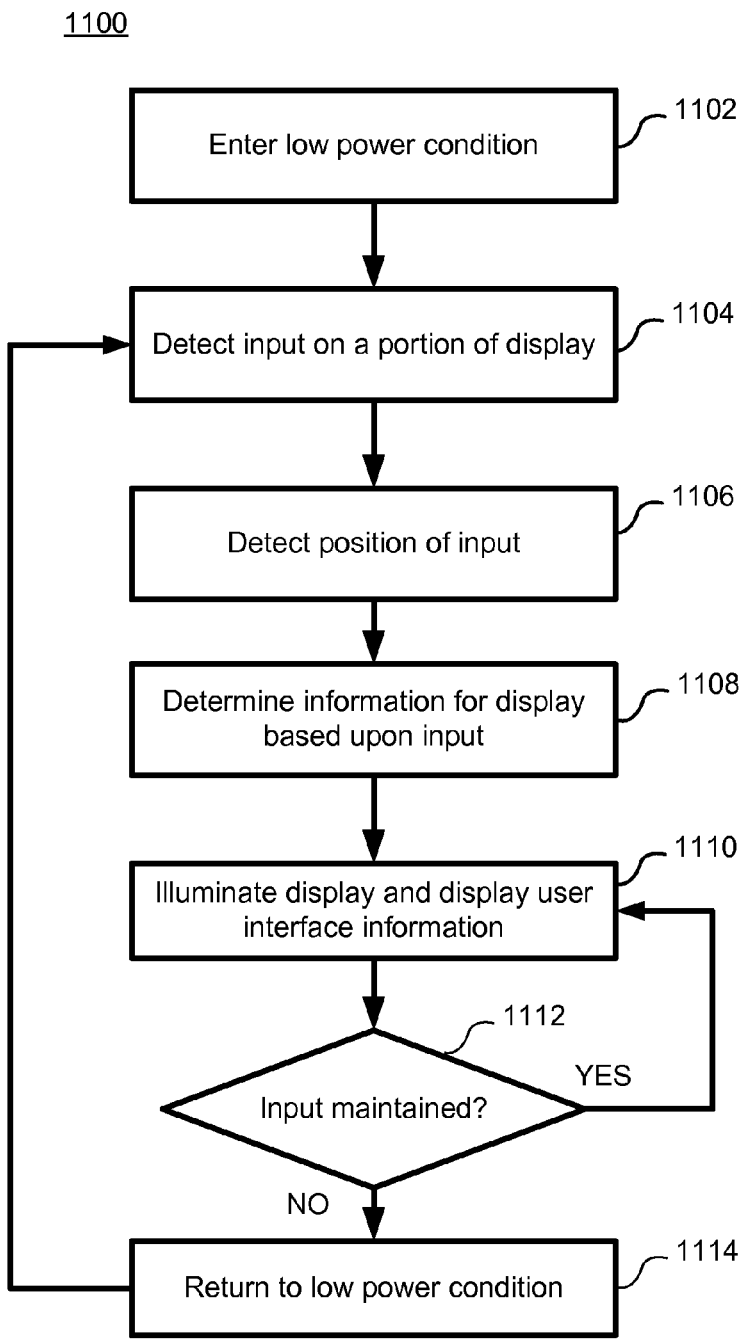
FIG. 11 shows another method of displaying a user interface when inserted in a covering apparatus.

FIG. 11 show a method 1100 of providing a peekable user interface as an expansion of method 1000. The portable electronic device detects that it is covered by a covering apparatus and enters a low power condition (1102). The device detects an input such as touch contact on a portion of the touch-sensitive display (1104) which may be by a user finger, a capacitive element provided in the case, or by an input sensor. In order for the input to be detected the device may have to be partially removed from the case or the cover moved away from the display making a portion of the display visible. The touch contact may be a single or multiple inputs depending on the case, or device configuration, such as a single, double, or triple finger contact. The position of the input or contact(s) within the display is determined (1106). The information for display is determined based upon the input (1108). For example a single contact may be for displaying the time, while a double may be for displaying recent e-mail, or triple input for displaying social network status updates. The information may also be based upon the amount of display area determined to be visible by the touch contact based upon the case type of the covering apparatus. For example a sleeve type case a single touch contact may only expose a triangular display portion while in a pouch type covering apparatus a single contact may be possible to show a significant portion of the display as the device is slid out of the pouch. The determined information is then displayed by illuminating at least the portion of the display that is visible (1110). The information may be formatted to be displayed with viewable display area. If the user maintains the contact with the display (YES at 1112) the information continues to be displayed, when contact changes and the input is not maintained (NO at 1112) the device re-enters the low power condition (1114). However if a new position or different touch contact is detected the change is detected (1104) and different information is presented, and the low power condition may not be initiated rather a different portion may be illuminated based upon the information to be displayed. During the display of the information in the user interface the user may not be able to interact with the information or may be presented with limited options or functions.

Figure 12:
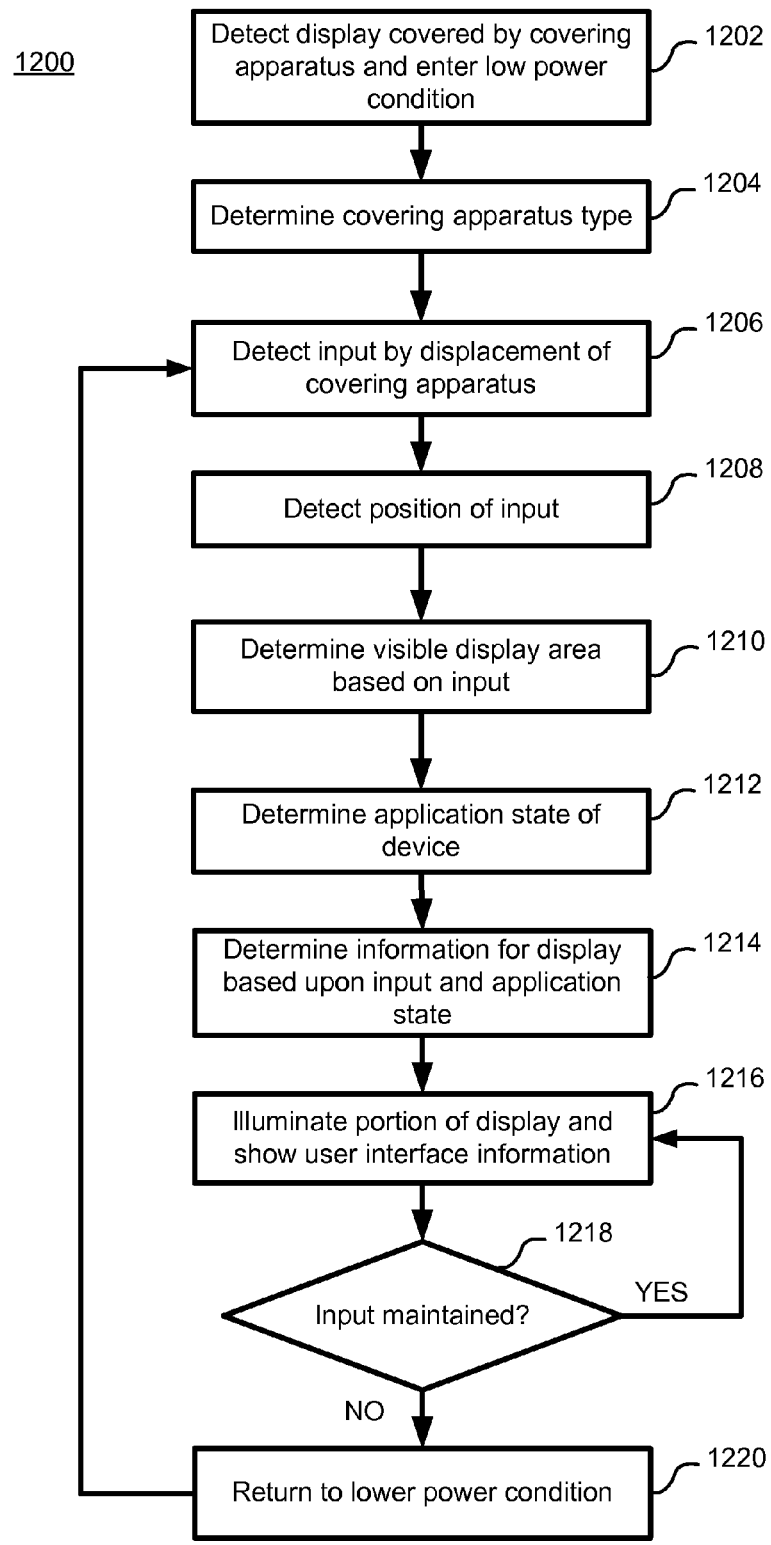
FIG. 12 shows a method of displaying a user interface based upon an application context.

FIG. 12 shows a method 1200 of providing a peekable user interface in a covering apparatus based upon an application context as an expansion of method 1100. The portable electronic device detects that it has been in a covering apparatus and enters a low power condition (1202). The type of covering apparatus is determined (1204) either based upon a predefined selection or by one or more sensors of the device which detect the type of case. For example the user may pre-select that a sleeve case will always be used, such that that the device may utilize a particular sensor to determine when it is inserted in the case, such as a light sensor or assume that it is in a case when it enters a locked or sleep mode. Alternatively the device may detect the case by a magnetic sensor or by receiving a radio frequency identifier (RFID) which would identify the type of case when inserted. The device detects input such as a touch contact on the touch-sensitive display (1206) which may be by one or more finger contacts or by one or more capacitive elements provided in the covering apparatus. In order for the input to occur the device may have to be partially removed from the case or the case moved away from the display. The touch contact may be a single or multiple inputs depending on the case, or device configuration, such as a single, double, or triple finger contact. The position of the input within the display is determined (1208). The visible display area defined by the input position can then be determined (1210). For example a single input contact for a sleeve case would define a triangular display area from the top corners of the display where two touch contacts would define a quadrilateral shaped display. An application or program state of the device, such as a current running application such as a media player, the last execute application such as a e-mail program, or a program that has recently generated an alert such as a text message or an incoming phone call is determined (1212). Depending on the preference configuration, and characteristics of the input such as the touch contact can be defined by a gesture type, position, number of contacts and/or display size shown, information associated with the determined application state is determined (1214) of information types such as time, recent messages, application status information, or social networking status updates for example. The amount of information may also be scaled based upon the display area visible based upon the input position. The determined information is then displayed (1216) on an illuminated portion of the visible portion of the display. The portion of the display that is not visible may not be illuminated to conserve power resources. If the user maintains the contact with the display (YES at 1218) the information continues to be displayed, when contact changes and the input is not maintained (NO at 1218) the device re-enters the low power condition (1220). However if a new position or different touch contact is detected the change is detected (1206) and different information is presented, and the low power condition may not be initiated rather a different portion may be illuminated based upon the information to be displayed.

During the display of the information in the user interface the user may not be able to interact with the content as the device is locked or the display information would change. The information that may be displayed while being peeked may be information types that a user may want to know about but may not necessarily want to interact with. For example the information types may be such as but not limited to date and time, currently running application information, received messages, missed calls, alerts, progress information, state information, social networking status information, text or instant messaging information, navigation or location information, or media playback state or playlist information. Each type of information may be determined for display by one or more parameters such as the display area visible, position of the touch contacts, the order that the touch contacts are received, the gesture or meta-navigation gesture associated with the touch contact, orientation of the device, the type of covering apparatus or operational state of the portable electronic device.

Figure 13:
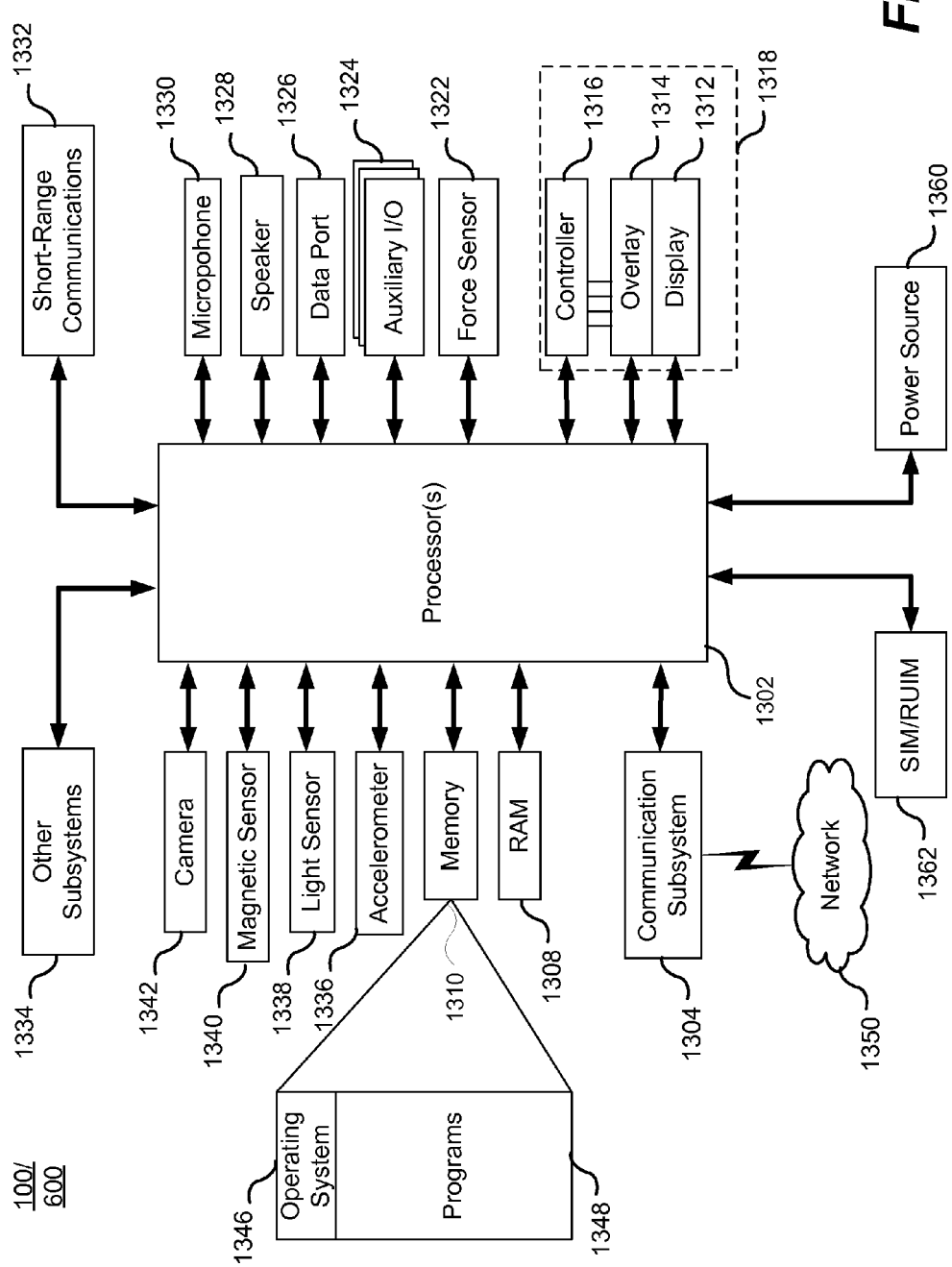
FIG. 13 shows a block diagram of a portable electronic device in accordance with an example embodiment.

FIG. 13 show a block diagram of a portable electronic device 100/600 in accordance with an example embodiment. A processor 1302, a multiple core processor or multiple processors, may interface with component or modules of the device to provide functionality required. A touch-sensitive display 1318 is coupled to the processor 1302. The touch-sensitive display 1318 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example embodiment, the touch-sensitive display 1318 is a capacitive touch-sensitive display which includes a capacitive touch-sensitive overlay 1314. The overlay 1314 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The portable electronic device 100/600 is maintained in a low-power condition, for example, by displaying no information on the display 1312 of the touch-sensitive display 1318, e.g., the display 1312 is blank or black with no pixels illuminated. The processing activities of the device 100/600 are typically significantly reduced during a low-power condition. Minimal touch sensing is active on the touch-sensitive display 1318, such that power usage is minimal. For example, scanning of touch sensors may take place every 100 to 500 ms or at a reduced rate from active touch sensing when in low-power condition. While the display 1312/touch-sensitive display 1318 is in low-power condition, an input is detected on the touch-sensitive display 1318 or by one or more sensors of the portable electronic device 100/600, which at least minimally wakes-up the device. The input may be a gesture such as a simple touch or a touch that moves, a contact with a screen, contact of capacitive elements or sensors for detecting a case position apparatus position. The gesture may be simple or complex. For example, the gesture may be a swipe that moves in a single direction along the display or a touch that hovers or is maintained at or near the same location. Any other gesture may be utilized. The gesture may begin anywhere on the touch-sensitive display 1318, although advantage may be gained, for example, by detecting a touch starting at any edge of the display, such as the bottom of the display or a corner of the display. The gesture may be a series or sequence of taps on the touch-sensitive display 1318. The location of the taps may or may not be relevant to detecting the gesture.

The processor 1302 interface with memory 1310 providing an operating system 1346 and programs or applications 1348 providing instructions for execution by the processor 1302. Random access memory 1308 is provided for the execution of the instructions and for processing data to be sent to or received from various components of the device. Various input/out devices or sensors may be provided such as an accelerometer 1336, light sensor 1338, magnetic sensor 1340 such as a hall effect sensor, and one or more cameras 1342 which may be used for detection of a covering apparatus type or the presence or position of the covering apparatus. A communication subsystem 1304 is provided for enabling data to be sent or received with a local area network 1350 or wide area network utilizing different physical layer and access technology implementations. A subscriber identity module or removable user identity module 1362 may be provided depending on the requirement of the particular network access technology to provide user access or identify information. Short-range communications 1332 may also be provided and may include near-field communication (NFC), radio frequency identifier (RFID), Bluetooth technologies. The device may also be provided with a data port 1326 and auxiliary input/output interface for sending and receiving data. A microphone 1330 and speaker 1328 may also be provided to enable audio communications via the device 100.

The display 1312 of the touch-sensitive display 1318 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as contact inputs, touch contacts or touch events, may be detected by the touch-sensitive display 1318. The processor 1302 may determine attributes of the touch, including a location of a touch. Touch location data may include an area of contact or a single point of contact, such as a point at or near a center of the area of contact, known as the centroid. A signal is provided to the controller 1316 in response to detection of a touch. A touch may be detected from any suitable object, such as a finger, thumb, appendage, or other items, for example, a stylus, pen, or other pointers, depending on the nature of the touch-sensitive display 1318. The location of the touch moves as the detected object moves during a touch. The controller 1316 and/or the processor 1302 may detect a touch by any suitable contact member on the touch-sensitive display 1318. Similarly, multiple simultaneous touches are detected.

One or more gestures are also detected by the touch-sensitive display 1318. A gesture is a particular type of touch on a touch-sensitive display 1318 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

An example of a gesture is a swipe (also known as a flick). A swipe has a single direction. The touch-sensitive overlay 1314 may evaluate swipes with respect to the origin point at which contact is initially made with the touch-sensitive overlay 1314 and the end point at which contact with the touch-sensitive overlay 1314 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 1314 to initialize the gesture, a horizontal movement of the detected object from the origin point to an end point towards the right or left side of the touch-sensitive overlay 1314 while maintaining continuous contact with the touch-sensitive overlay 1314, and a breaking of contact with the touch-sensitive overlay 1314. Similarly, a vertical swipe typically comprises an origin point towards the top or bottom of the touch-sensitive overlay 1314 to initialize the gesture, a horizontal movement of the detected object from the origin point to an end point towards the bottom or top of the touch-sensitive overlay 1314 while maintaining continuous contact with the touch-sensitive overlay 1314, and a breaking of contact with the touch-sensitive overlay 1314.

Swipes can be of various lengths, can be initiated in various places on the touch-sensitive overlay 1314, and need not span the full dimension of the touch-sensitive overlay 1314. In addition, breaking contact of a swipe can be gradual in that contact with the touch-sensitive overlay 1314 is gradually reduced while the swipe is still underway.

Meta-navigation gestures may also be detected by the touch-sensitive overlay 1314. A meta-navigation gesture is a gesture that has an origin point that is outside the display area of the touch-sensitive overlay 1314 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 1314. Thus, two fingers may be utilized for meta-navigation gestures. Further, multi-touch meta-navigation gestures may be distinguished from single touch meta-navigation gestures and may provide additional or further functionality or be used to distinguish between types of information that the user may required to be displayed on the device which would also be dependent on the display area available for display.

In some example embodiments, an optional force sensor 1322 or force sensors is disposed in any suitable location, for example, between the touch-sensitive display 1318 and a back of the portable electronic device 100 to detect a force imparted by a touch on the touch-sensitive display 1318. The force sensor 1322 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Different magnitudes of force may be associated with different functions or input. For example, a lesser force may result in displaying only time information in the user interface information, and a higher force may result in the display of e-mail information in the user interface information.

Figure 14:
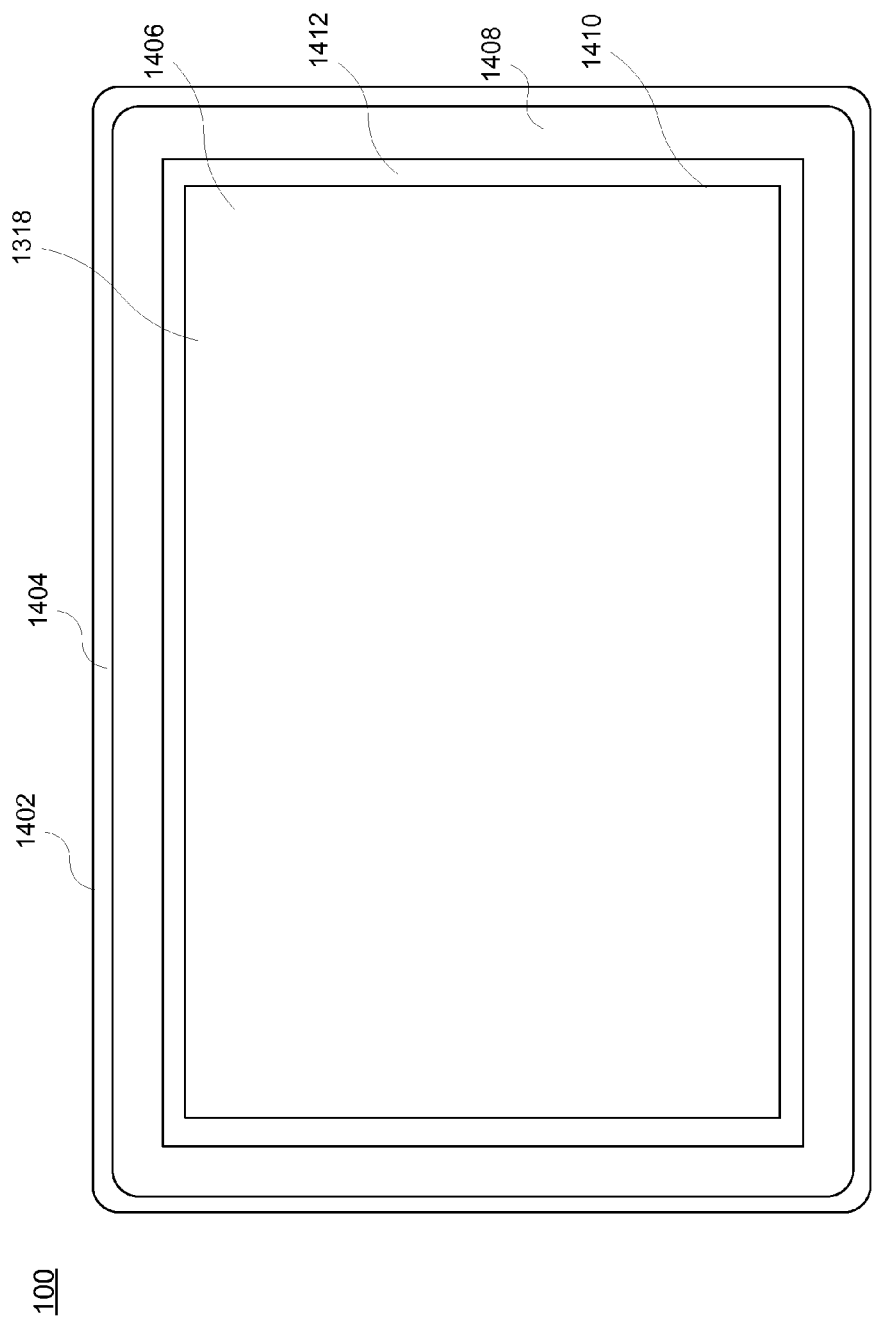
FIG. 14 shows a front view of an example of a portable electronic device.

FIG. 14 is a front view of an example of a portable electronic device 100. The portable electronic device 100 includes a housing 1402 that encloses components such as shown in FIG. 13. The housing 1402 may include a back, sidewalls, and a front 1404 that frames the touch-sensitive display 1318.

In the example of FIG. 14, the touch-sensitive display 1318 is generally centered in the housing 1402 such that a display area 1406 of the touch-sensitive overlay 1314 is generally centered with respect to the front 1404 of the housing 1402. The non-display area 1408 of the touch-sensitive overlay 1314 extends around the display area 1406. In the presently described embodiment, the width of the non-display area is 4 mm.

For the purpose of the present example, the touch-sensitive overlay 1314 extends to cover the display area 1406 and the non-display area 1408. Touches on the display area 1406 may be detected and, for example, may be associated with displayed selectable features. Touches on the non-display area 1408 may be detected, for example, to detect a meta-navigation gesture. Alternatively, meta-navigation gestures may be determined by both the non-display area 1408 and the display area 1406. The density of touch sensors may differ from the display area 1406 to the non-display area 1408. For example, the density of nodes in a mutual capacitive touch-sensitive display, or density of locations at which electrodes of one layer cross over electrodes of another layer, may differ between the display area 1406 and the non-display area 1408.

Gestures received on the touch-sensitive display 1318 may be analyzed based on the attributes to discriminate between meta-navigation gestures and other touches, or non-meta navigation gestures. Meta-navigation gestures may be identified when the gesture crosses over a boundary near a periphery of the display 112, such as a boundary 1410 between the display area 1406 and the non-display area 1408. In the example of FIG. 14, the origin point of a meta-navigation gesture may be determined utilizing the area of the touch-sensitive overlay 1314 that covers the non-display area 1408.

A buffer region 1412 or band that extends around the boundary 1410 between the display area 1406 and the non-display area 1408 may be utilized such that a meta-navigation gesture is identified when a touch has an origin point outside the boundary 1410 and the buffer region 1412 and crosses through the buffer region 1412 and over the boundary 1410 to a point inside the boundary 1410. Although illustrated in FIG. 14, the buffer region 1412 may not be visible. Instead, the buffer region 1412 may be a region around the boundary 1410 that extends a width that is equivalent to a predetermined number of pixels, for example. Alternatively, the boundary 1410 may extend a predetermined number of touch sensors or may extend a predetermined distance from the display area 1406. The boundary 1410 may be a touch-sensitive region or may be a region in which touches are not detected.

Gestures that have an origin point in the buffer region 1412, for example, may be identified as non-meta navigation gestures. Optionally, data from such gestures may be utilized by an application as a non-meta navigation gesture. Alternatively, data from such gestures may be discarded such that touches that have an origin point on the buffer region 1412 are not utilized as input at the portable electronic device 100.

Figure 15:
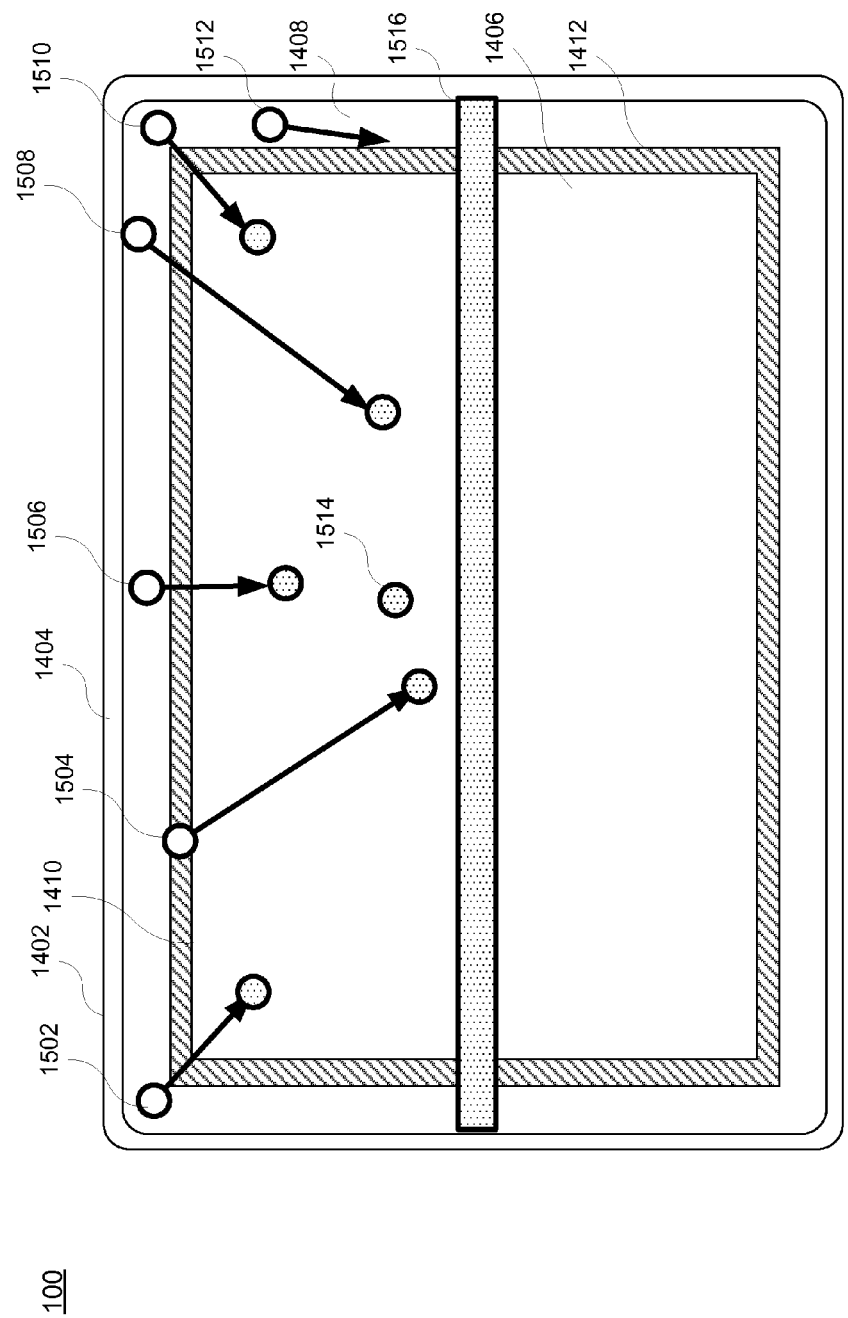
FIG. 15 shows examples of touches on the portable electronic device of FIG. 14.

FIG. 15 illustrates examples of touches on the portable electronic device of FIG. 15. FIG. 15 illustrates examples of touches on the touch-sensitive display 1318. The buffer region 1412 is illustrated in FIG. 15 by hash markings for the purpose of explanation. As indicated, the buffer region 1412 may not be visible to the user. For the purpose of explanation, touches are illustrated by circles at their points of origin. Arrows extending from the circles illustrate the paths of the touches that are gestures.

The touch 1502 begins at the origin point outside the boundary 1410 and the outside the buffer region 1412. The path of the touch 1502 crosses the buffer region 1412 and the boundary 1410 and is therefore identified as a meta-navigation gesture. Similarly, the touches 1506, 1508, and 1510 each have origin points outside the boundary 1410 and the buffer region 1412 and their paths cross the buffer region 1412 and the boundary 1410. Each of the touches 1506, 1508 and 1510 is therefore identified as a meta-navigation gesture. A single touch contact may also be provided 1514 without a vector or motion provided, for example the user moving the covering apparatus away from the device and then touching a point on the display area 1406. The touch contact 1504 and 1508 may be defined as a vector having a start point and an end point within the display area. The combined inputs would be used to define a display area relative to an outer edge of the device when the touch contact is held defining when the covering apparatus is being peeked. A touch contact 1512 that does not enter the display area 1406 may not activate the display of user interface as not definable area would be visible. However touch contact 1512 may be combined with another touch contact such as touch contact 1502 would define a displayable area for user interface information.

The touch contact 1516 may also be defined as a region extending across the surface of the display such as provided by a capacitive elements provided within the case. The display area may be defined from the position of the touch contact 1506 parallel to an edge of the device 1402 and may be defined in a landscape or portrait mode depending on the aspect ratios of the device 1402. Although the device is describe as having a touch-sensitive non-display area, the device may also not have a touch-sensitive non-display are in embodiments of the present disclosure.

Although capacitive display technologies are described in the above examples other types of display sensing technologies may be utilized to identify gesture or movement of the portable electronic device within the case.

In some embodiments, any suitable computer readable memory can be used for storing instructions for performing the processes described herein. For example, in some embodiments, computer readable media can be transitory or non-transitory. For example, non-transitory computer readable media can include non-volatile computer storage memory or media such as magnetic media (such as hard disks), optical media (such as compact discs, digital video discs, Blu-ray discs, etc.), semiconductor media (such as flash memory, read only memory (ROM), Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

Although the description discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The invention claimed is:

1. A method of displaying a user interface on a touch-sensitive display of a portable electronic device when the portable electronic device is in a deformable covering apparatus, the method comprising:
   detecting, in a locked state of the electronic device wherein the touch-sensitive display in said locked state is unilluminated and active, a gesture implemented by contact of at least one finger on a portion of the unilluminated touch-sensitive display;
   determining, from the contact, and prior to illuminating said unilluminated display, a number of touch contact positions and displacement of the touch contact positions relative to an edge of the display;
   using the determined number of touch contact positions and displacement of the touch contact positions on the unilluminated display, to define a closed shape encompassing a starting position and end position of the determined touch contact positions on the touch-sensitive display;
   scaling the user interface according to the defined closed shape; and
   displaying the scaled user interface by illuminating the unilluminated display only in the defined closed shape, the user interface presenting information other than an unlock user interface screen, and the information being determined at least in part by a type of the gesture detected.

2. The method of claim 1 further comprising identifying a type of the covering apparatus wherein expected characteristics of the gesture and associated user interface information are defined in relation to the type of covering apparatus.

3. The method of claim 2 wherein the gesture comprises one or more positions of input relative to the display wherein the information presented by the user interface is based upon an area defined by the uncovered portion of the display defined by the one or more positions of the gesture relative to the edge of the touch-sensitive display and the type of covering apparatus.

4. The method of claim 1 further comprising sensing the covering apparatus over the touch-sensitive display by one or more sensors of the portable electronic device and a type of covering apparatus is determined by one or more methods selected from a group comprising: a selection by a predefined covering apparatus type previously selected, receiving one or more sensor inputs to determine the covering apparatus type, or receiving a radio frequency identifier associated with the covering apparatus to identify the covering apparatus type.

5. The method of claim 1 wherein the information presented in the user interface is further determined in part based upon an application state on the portable electronic device prior to entering a power conservation state.

6. The method of claim 1, further including illuminating at least the uncovered portion of the display, by only illuminating pixels required to show the information presented in the user interface.

7. A portable electronic device comprising:
   a touch-sensitive display;
   a processor coupled to the touch-sensitive display;
   a memory coupled to the processor containing instructions which when executed by the processor perform:
      detecting in a locked state of the device wherein the touch-sensitive display in said locked state is unilluminated and active, a gesture implemented by contact of at least one finger on a portion of the unilluminated touch-sensitive display;
   determining from the contact, and prior to illuminating said unilluminated display, a number of touch contact positions and displacement of the touch contact positions relative to an edge of the display;
   using the determined number of touch contact positions and displacement of the touch contact positions on the unilluminated display to define a closed shape encompassing a starting position and end position of the determined touch contact positions on the touch-sensitive display;
   scaling the user interface according to the defined closed shape; and
   displaying the scaled user interface by illuminating the unilluminated display only in the defined closed shape, the user interface presenting information other than an unlock user interface screen, and the information being determined at least in part a type of the gesture detected.

8. The portable electronic device of claim 7 further comprising identifying a type of the covering apparatus wherein expected characteristics of the gesture and associated user interface information are defined in relation to the type of covering apparatus.

9. The portable electronic device of claim 8 wherein the gesture comprises one or more positions of input relative to the display wherein the information presented by the user interface is based upon a determined amount of display area defined by the uncovered portion of the display defined by the one or more positions of the gesture relative to the edge of the touch-sensitive display and the type of covering apparatus.

10. The portable electronic device of claim 7 further comprising sensing the covering apparatus over the touch-sensitive display by one or more sensors of the portable electronic device and a type of covering apparatus is determined by one or more methods selected from a group comprising: a selection by a predefined covering apparatus type previously selected, receiving one or more sensor inputs to determine the covering apparatus type, or receiving a radio frequency identifier associated with the covering apparatus to identify the covering apparatus type.

11. The portable electronic device of claim 7 wherein the information presented in the user interface is further determined in part based upon an application state on the portable electronic device prior to entering a power conservation state.

12. The portable electronic device of claim 7, including illuminating at least the uncovered portion of the display by only illuminating pixels required to show the information presented in the user interface.

13. A non-transitory, tangible computer readable memory containing instructions for presenting a user interface on a portable electronic device when the portable electronic device is in a deformable covering apparatus, the instructions which when executed by a processor performing the method comprising:

- detecting in a locked state of the electronic device wherein the touch-sensitive display in said locked state is unilluminated and active a gesture implemented by contact of at least one finger on a portion of the unilluminated touch-sensitive display; and
- determining from the contact, and prior to illuminating said unilluminated display, a number of touch contact positions and displacement of the touch contact positions relative to an edge of the display;
- using the determined number of tough contact positions and displacement of the touch contact positions on the unilluminated display, to define a closed shape encompassing a starting position and end position of the determined touch contact positions on the display;
- scaling the user interface according to the defined closed shape; and
- displaying the scaled user interface by illuminating the unilluminated display only in the defined closed shape, the user interface presenting information other than an unlock user interface screen, and the information being determined at least in part by a type of the gesture detected.

14. The method of claim 1 wherein further displacement of the covering apparatus changes the type of information displayed on the display.

15. The portable electronic device of claim 7 wherein further displacement of the covering apparatus changes the type of information displayed on the display.

16. The method of claim 1, further including illuminating at least the uncovered portion of the touch-sensitive display and displaying the user interface based upon a position of the capacitive element along the display.

17. The method of claim 1, wherein the type of information displayed on the display is further based upon the position of a capacitive element along the display.

18. The method of claim 1, wherein the gesture is a meta-navigation gesture determined based upon a swipe from a touch-sensitive non-display area from the edge of the display towards a center of the touch-sensitive display.

* * * * *

UNITED STATES PATENT AND TRADEMARK OFFICE
CERTIFICATE OF CORRECTION

PATENT NO. : 9,778,706 B2
APPLICATION NO. : 13/404308
DATED : October 3, 2017
INVENTOR(S) : Donald Somerset McKenzie Page 1 of 1

It is certified that error appears in the above-identified patent and that said Letters Patent is hereby corrected as shown below:

In the Claims

• In Claim 13, Column 15, Line 20, change the word "tough" to "touch".

Signed and Sealed this
Twenty-fourth Day of April, 2018

Andrei Iancu
*Director of the United States Patent and Trademark Office*